Patented Mar. 15, 1932

1,850,057

UNITED STATES PATENT OFFICE

JOHN C. BAKER, OF MONTCLAIR, AND FRANZ C. SCHMELKES, OF BLOOMFIELD, NEW JERSEY, ASSIGNORS TO WALLACE & TIERNAN PRODUCTS, INC., OF BELLEVILLE, NEW JERSEY, A CORPORATION OF NEW JERSEY

METHOD OF MAKING DI-CHLORAMINE

No Drawing.    Application filed May 20, 1931.  Serial No. 538,867.

This invention relates to the manufacture of di-chloramine, especially dilute solutions thereof suitable for use in the sterilization of water.

When solutions containing available chlorine react with solutions containing ammonia or ammonium salts, the resulting product may be nitrogen tri-chloride ($NCl_3$), di-chloramine ($NCl_2$), or mono-chloramine ($NH_2Cl$). As to which of these three compounds are formed by the reaction of the two solutions can be determined and controlled by the regulation of the hydrogen ion concentration of the resulting mixture. In case the solution is more acid than pH 4.4, nitrogen tri-chloride is formed, and if more alkaline than pH 8.5, mono-chloramine is formed substantially exclusively. At hydrogen ion concentrations within the range of 4.4 to 8.5, varying proportions of di-chloramine and mono-chloramine are formed. The maximum yield of di-chloramine is obtained in the zone between pH 4.4 and 5.3. In order to produce di-chloramine substantially quantitatively it then becomes necessary to regulate the hydrogen ion concentration of the resulting mixture in this narrow zone. The ordinary solutions of chlorine or hypochlorous acid and ammonia or ammonium salts, such as the chloride or sulphate, do not of themselves possess sufficient and proper buffer properties to maintain the hydrogen ion concentration in this zone, so that their admixture will usually result in formation of nitrogen tri-chloride or of a predominant proportion of mono-chloramine.

As a neutral solution has a pH of 7.0, it follows that in general the solutions should be slightly acid but not sufficiently acid to form substantial amounts of nitrogen tri-chloride.

When chlorine reacts with an ammonium salt, such as the chloride, acid is formed. The reaction, so long as the pH is favorable to the production of di-chloramine, is substantially as follows:

(1)  $NH_4Cl + 2Cl_2 = NHCl_2 + 3HCl$

This free strong hydrochloric acid must be absorbed as fast as it is formed if the pH is to be kept within the desired limits.

The usual method of controlling the pH in chemical processes is by means of readily soluble buffers, such as an acetate, phosphate, phthalate or borate of an alkali metal, the amount of buffer added being carefully controlled to give the desired pH. Careful control of the quantities of such soluble buffers used is necessary, especially where the pH has to be kept to within ±0.5, since a soluble buffer maintains pH only if used in the right quantity. Hence, when a variable excess is added beyond that required for acid absorption, a variable pH is obtained.

One of the objects of the present invention is to provide a buffer which will maintain a nearly constant pH over a wide range of quantities used.

We have found that this desirable result may be attained by the use of a nearly insoluble buffer which becomes soluble below a certain pH. Using such a buffer the solution is always saturated, the excess remaining undissolved.

Another object of the present invention is to cheapen the production of di-chloramine, first by reducing the amount of buffer required, and second by substituting a much less expensive form of buffer for the soluble buffers used heretofore.

The reduction of the amount of buffer required is obtained in various ways, first by using hypochlorous acid in place of chlorine. The reaction between hypochlorous acid and ammonium chloride, under proper pH conditions, is as follows:

(2)  $NH_4Cl + 2HOCl = NHCl_2 + 2H_2O + HCl$

Comparing reaction (1) with reaction (2), it will be seen that the amount of hydrochloric acid formed by the latter is only ⅓ that formed in the former reaction. Consequently, the amount of buffer required to absorb the acid formed is reduced to ⅓.

The hypochlorous acid is conveniently formed by the reaction of a solution of chlorine on calcium carbonate:

(3) $2CaCO_3 + 2Cl_2 + 2H_2O = CaCl_2 + 2HOCl + Ca(HCO_3)_2$

Another way in which the quantity of buffer required may be reduced is by the use of a base in amount rather less than required to neutralize all of the acid liberated, so that only enough buffer is required to take care of the excess acid.

A third way in which the amount of buffer may be cut down to a minimum without the trouble and expense of accurately measuring the chemicals used, is to employ a buffer which is difficultly soluble or almost insoluble but reacts with acid below the desirable pH to form a relatively soluble product. With such a buffer, all that is required is to see that there is at all times an excess of the difficultly soluble compound. This compound, being so nearly insoluble, remains in the reaction chamber until used up and only the relatively soluble reaction products are carried away with the solution of di-chloramine.

These desirable results are obtained by the use of a phosphate of calcium as the buffer and calcium carbonate as the base. The actual buffer compound is the di-calcium phosphate, so that, as the addition of acid to tri-calcium phosphate gives the di-calcium salt, the material added initially may be either the di- or tri-calcium compound. While, theoretically, the tri-calcium salt might appear the superior of the two, as having greater acid absorbing properties, the di-calcium salt has the advantage that it provides a buffer not only against excess acidity but also against excess alkalinity.

The buffer action of di-calcium phosphate is based upon the fact that, as one proceeds from $Ca_3(PO_4)_2$ to $CaHPO_4$ to $CaH_4(PO_4)_2$, there are comparatively sudden jumps in pH at the points at which (1) all of the $Ca_3(PO_4)_2$ disappears and one has only $CaHPO_4$, and (2) all of the $CaHPO_4$ disappears and one has only $CaH_4(PO_4)_2$. Over the range between points (1) and (2) the pH does not change much, due not only to the action of the phosphate radical but also to the relatively insoluble nature of the di-calcium phosphate. Hence, to get buffer action, one has to have enough $CaHPO_4$ to absorb all the acid liberated and still leave an excess of $CaHPO_4$.

If a base is added in lesser amount than the acid liberated, then you will reduce the amount of acid which must be absorbed by the $CaHPO_4$, and, hence, the quantity of the latter may be reduced. If a base is added in excess of the amount of acid liberated, then you will drop down on the alkaline side by forming some $Ca_3(PO_4)_2$ and mono-chloramine will be formed.

Mono-calcium phosphate $CaH_4(PO_4)_2$ is soluble, while the di-calcium salt is nearly insoluble, so that the insoluble residue is almost wholly the di-calcium compound.

The product of the reaction between the acid liberated and the calcium carbonate is $Ca(HCO_3)_2$, which, in the concentrations used, is soluble. Hence, although insoluble $CaCO_3$ is added to the reaction chamber, there is no insoluble residue therefrom outside of impurities.

The reactions involved are substantially as follows:

(4) $2CaCO_3 + 2HCl = CaCl_2 + Ca(HCO_3)_2$
(5) $2CaHPO_4 + 2HCl = CaCl_2 + CaH_4(PO_4)_2$

By the last reaction the acidity is held automatically within the optimum pH range for the production of di-chloramine, viz: 4.4 and 5.3.

The simplest method of carrying out the process is to mix the ammonium chloride, calcium carbonate and calcium phosphate together and then add the mixture as a unit to the treating tank. By mixing these solid materials together, the correct proportion of ammonium salt, base and buffer will always be maintained, irrespective of any variations in the rate of feed of the mixture as a whole to the hypochlorous acid solution. An excess of the latter over the mixture is not ordinarily very harmful, as hypochlorous acid is an extremely weak acid. An excess of the mixture over the hypochlorous acid merely results in wasting such excess materials.

A desirable mixture to use has the following composition:

53.5 parts by weight $NH_4Cl$
38 parts by weight $CaHPO_4.2H_2O$
77 parts by weight $CaCO_3$ This mixture is used in the proportion of 1.2 pounds to each pound of chlorine used in reaction (3). With this proportion, assuming all ingredients to be chemically pure, the ammonium chloride is slightly in excess of that required for reaction (2). The calcium carbonate is about 20% under that required to absorb all the hydrochloric acid per reaction (4), and the di-calcium phosphate is about 10% in excess of that needed to absorb, by reaction (5), the excess of hydrochloric acid remaining after reaction (4).

A very satisfactory method of operating the process is as follows:

Chlorine is dissolved in a flow of water to approximately .2% concentration and the resulting solution passed over or through limestone of sufficient fineness to convert the chlorine water to hypochlorous acid. A suitable method for preparing hypochlorous acid in this way was described in patent of J. C. Baker No. 1,413,153. The effluent from the reaction with the limestone is then passed into a container where the above described mixture is fed in the proportion of 1.2 pounds to 1.0 pound of chlorine, this being a slight excess of the powder. It is desirable to run some water in with the powder to get good wetting and mixture for quick reaction. Also, it is desirable to dilute the total bulk of solution so that the available chlorine concentration is approximately .1%, as di-chloramine is more stable at strengths of .1% and below of available chlorine. Suitable stirring or agitating means may be provided to get good contact between the powder and the solution, followed by suitable means for settling any excess insoluble powder out of the solution before it is discharged to the point of use. This method results in a quantitative conversion of the chlorine used into di-chloramine. The accumulation of the excess powder in the reaction chamber is desirable, as the more material accumulates there, the more certain is the operation of not extending beyond the limits of pH for di-chloramine formation. The insoluble material that accumulates in the reaction chamber is practically all di-calcium phosphate, as the calcium carbonate is completely dissolved before the di-calcium phosphate comes into action.

The reaction is carried out at ordinary water temperatures and is about 90% complete in the first few minutes of reaction.

While ammonium chloride, calcium carbonate and phosphate have been mentioned as convenient substances to employ, the invention is not limited thereto. Other salts of ammonium may be employed, such as the sulphate.

Similarly, other bases may be used for the partial neutralization of the acid liberated, such as calcium hydroxide, soda ash, magnesium hydroxide, magnesium carbonate or other similar bases. Strong bases, such as soda ash and calcium hydroxide, should not ordinarily be mixed with the ammonium salt and buffer to form a unitary mixture on account of the fact that the strong base is likely to liberate the ammonia, which then goes off into the air and is lost. Soluble bases, such as soda ash, may also have to be added separately and gradually, as otherwise they are apt to create alkaline conditions during the first part of the process, before acid liberation has proceeded far enough to give the desired slightly acid solution. In this connection it should be noted that excess of alkalinity is not as serious as excess of acidity, as the mono-chloramine, formed in alkaline solutions, can be converted into di-chloramine by bringing the pH within proper limits, but the nitrogen tri-chloride, formed in acid solutions, cannot be converted into either mono- or di- chloramine without large losses of chemicals. The process may also be carried out without the use of any bases, using sufficient nearly insoluble buffer to take care of all the acid formed.

Other buffers than calcium phosphate may be used so long as they are adapted to keep the pH within the range requisite for efficient production of di-chloramine. Thus, di- or tri- barium phosphate, di- or tri- magnesium phosphate and similar difficultly soluble phosphates may be employed in place of di- or tri calcium phosphate. Then, when hypochlorous acid is used in place of chlorine to reduce the acid liberated and/or when bases are used to neutralize the greater part of the acid formed, the more expensive soluble phosphates, such as those of sodium, may be used without increasing the cost to a prohibitive extent. Other salts than phosphates may be used as buffers, but, as the phosphates are not only cheap but also automatically arrest the pH in the zone most favorable for the production of di-chloramine, they are ordinarily superior to other salts.

What is claimed is:

1. The process of making di-chloramine, which comprises causing available chlorine to react with ammoniacal material in the presence of material including a difficultly soluble buffer, adapted and in quantity sufficient to retain the pH between 4.4 and 8.5.

2. The process as in claim 1, in which the material containing the buffer is adapted and in quantity sufficient to retain the pH between 4.4 and 7.0.

3. The process as in claim 1, in which the material containing the buffer is adapted and in quantity sufficient to retain the pH between 4.4 and 5.3.

4. The process as in claim 1, in which the buffer is a difficultly soluble phosphate.

5. The process as in claim 1, in which the buffer comprises a phosphate of calcium.

6. The process of making di-chloramines, which comprises causing hypochlorous acid to react with ammoniacal material in acid solution and in the presence of material containing a buffer, adapted and in quantity sufficient to prevent the acidity exceeding pH 4.4.

7. The process of making di-chloramine, which comprises causing hypochlorous acid to react with ammonia in acid solution and in the presence of material containing a buffer, adapted and in quantity sufficient to prevent the acidity exceeding pH 4.4.

8. The process of making di-chloramine, which comprises causing hypochlorius acid to react with an ammonium salt in the presence of material containing a buffer, adapted and in quantity sufficient to prevent the acidity exceeding pH 4.4.

9. The process of making di-chloramine, which comprises adding a mixture of an ammonium salt, a calcium phosphate and calcium carbonate to a solution containing available chlorine.

10. Tht process of making di-chloramine, which comprises adding a mixture of an ammonium salt, a calcium phosphate and calcium carbonate to a solution containing hypochlorous acid.

11. The process of making di-chloramine, which comprises causing available chlorine to react with ammoniacal material in the presence of a base, adapted and in quantity sufficient to absorb the major part of the acid liberated by such reaction, and a buffer, adapted and in quantity sufficient to absorb the remainder of the acid so liberated and retain the pH between 4.4 and 7.0.

12. The process as in claim 11, in which the pH is retained between 4.4 and 5.3.

13. The process as in claim 11, in which the base comprises a carbonate.

14. The process as in claim 11, in which the base comprises calcium carbonate.

In testimony whereof, we have hereunto set our hands.

JOHN C. BAKER.
FRANZ C. SCHMELKES.